(12) United States Patent
Hewitt et al.

(10) Patent No.: US 10,075,592 B2
(45) Date of Patent: Sep. 11, 2018

(54) INTELLIGENT CALL LEAD GENERATION

(71) Applicant: Gen3Ventures, LLC, Greenwood, IN (US)

(72) Inventors: Mason Hewitt, Chicago, IL (US); Matthew Erdos, Saint Petersburg, FL (US); Christopher Erdos, Boynton Beach, FL (US)

(73) Assignee: Gen3Ventures, LLC, Greenwood, IN (US)

( * ) Notice: Subject to any disclaimer, the term of this patent is extended or adjusted under 35 U.S.C. 154(b) by 468 days.

(21) Appl. No.: 14/547,196

(22) Filed: Nov. 19, 2014

(65) Prior Publication Data

US 2015/0139413 A1    May 21, 2015

Related U.S. Application Data

(60) Provisional application No. 61/906,245, filed on Nov. 19, 2013.

(51) Int. Cl.
*H04M 3/523* (2006.01)
*H04M 7/00* (2006.01)
*H04M 3/51* (2006.01)

(52) U.S. Cl.
CPC ......... *H04M 3/523* (2013.01); *H04M 3/5191* (2013.01); *H04M 7/003* (2013.01)

(58) Field of Classification Search
CPC .. H04M 3/523; H04M 3/5191; H04M 3/5183; H04M 3/5238
See application file for complete search history.

(56) References Cited

U.S. PATENT DOCUMENTS

| | | | |
|---|---|---|---|
| 8,413,058 B1* | 4/2013 | Lewis | H04L 67/02 715/700 |
| 2011/0299523 A1* | 12/2011 | Brown | G06Q 30/02 370/352 |
| 2013/0279671 A1* | 10/2013 | Wisman | H04M 3/2218 379/112.01 |

* cited by examiner

*Primary Examiner* — Antim G Shah
(74) *Attorney, Agent, or Firm* — Craige Thompson; Thompson Patent Law

(57) ABSTRACT

A computerized method and system for intelligent call lead generation is disclosed. The method includes receiving a telephone number and request for communication from a consumer, identifying an enterprise contact based at least in part on the request for communication, placing a first telephone call to the telephone number with a communication system and a second telephone call to a second telephone number associated with the enterprise contact with the communication system, merging the first telephone call and the second telephone call with the communication system into a merged call, and transmitting communication between the consumer and the enterprise contact with the communication system through the merged call.

15 Claims, 11 Drawing Sheets

INTELLIGENT CALL LEAD GENERATION

CROSS REFERENCE TO RELATED APPLICATION

This application claims the benefit of U.S. Provisional Application No. 61/906,245 filed Nov. 19, 2013.

BACKGROUND

Call centers know that inbound calls convert into sales at a significantly higher rate than when they attempt to contact a prospective customer via an outbound call. Enterprises have developed extensive technologies and methodologies to increase contact rates, but the fact remains that a prospective customer can only be converted into a sale if contact is made. Furthermore, popular methods of generating inbounds calls, such as Click to Call or publishing of a contact phone number, fail if the prospective customer or inbound call center don't answer the phone in a timely manner or a connection is between the parties is not made for some other reason. Because the prospective customer's contact data was not collected through a web form, follow-up with that individual is often impossible and could be illegal of the individual has not given permission to be contacted.

Enterprises, therefore, desire to increase inbound call volumes because unlike attempting contact through an outbound call, inbound calls guarantee that a customer will be contacted. But, some prospective customers prefer to fill out an online contact form, putting the responsibility of making contact on an outbound call center. Some enterprises have attempted to force prospective customers to make an inbound call instead of filling out an online form, but this method eliminates prospective customers who prefer to fill out an online contact form. Others have implemented technologies that allow the customer to input their number to receive an immediate call (commonly known as Click to Call), but this method interrupts the contact form process through either a pop-up or by giving the customer an alternate option from filling out the contact form. This method also results in an absence of prospective customer contact information should the call not be connected.

Accordingly, there exists a need for intelligent call lead generation which does not interrupt the standard contact form process flow yet enables enterprises to increase inbound call volume, thereby increasing contact rates.

DETAILED DESCRIPTION

In the present disclosure, a system and method for intelligent call lead generation is disclosed. The system and method disclosed herein enable any enterprise to provide an efficient point of contact solution to consumers through a web page, mobile application, or other communication which, when activated by the consumer, initiates a telephone call between the consumer and the enterprise without interrupting the contact form process. In a preferred embodiment, the enterprise will configure the application to identify and establish communication with an appropriate resource based on where the communication established by the application originated.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

Figure 1A:
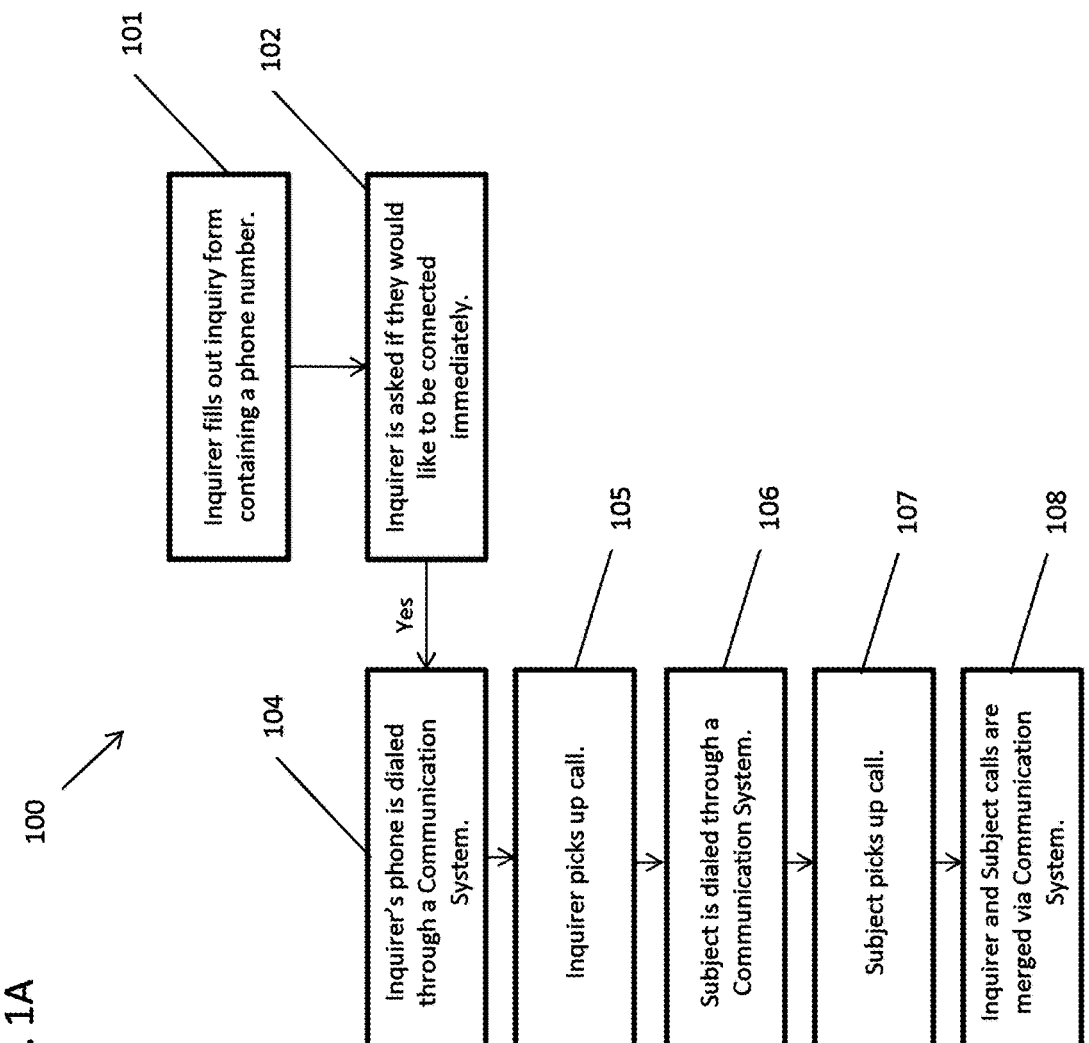
FIG. 1A illustrates a flowchart of a method for intelligent call lead generation according to at least one embodiment of the present disclosure.

Referring now to FIG. 1A, there is shown a method 100 for intelligent call lead generation according to at least one embodiment of the present disclosure. As shown in FIG. 1A, the method 100 includes an Inquirer filling out a form containing a telephone number in step 101, an Inquirer being offered a direct telephone connection in step 102, placing a call to the Inquirer through a communication system in step 104, the Inquirer answering the call in step 105, placing a call to a Subject through the communication system in step 106, the Subject answering the call in step 107, and merging the Subject's call and the Inquirer's call through the communication system in step 108.

In at least one embodiment of the present disclosure, the method 100 is implemented in connection with or in relation to a communication, website, mobile application, or other interactive resource which enables input from a user to be transmitted over a computer network. In such an embodiment, the consumer is an Inquirer and provides his or her telephone number through the interactive resource in step 101. The Inquirer may provide his or her telephone number in a variety of ways, including, for example, inputting the telephone number through an input field in a web-based form and submitting the form, clicking a link present on a website while browsing from a mobile device which queries the mobile device for the telephone number, sending an SMS, MMS, or other communication which provides the telephone number, or other interactive session which enables transmitting information from a consumer to an enterprise over a computer network.

Figure 3:
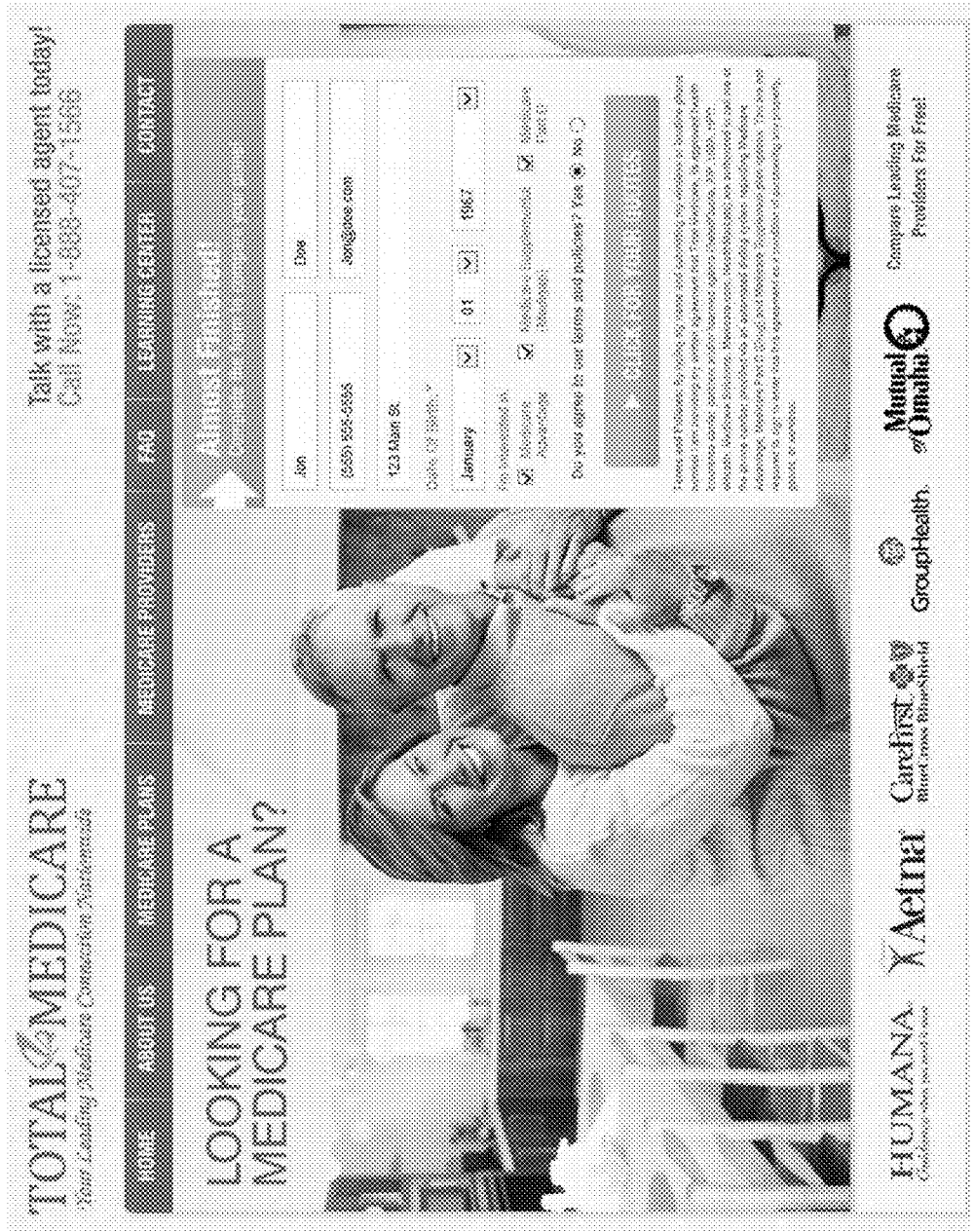
FIGS. 3-8 show exemplary screen shots of a graphical user interface generated on a web browser or user device as transmitted from a system and/or generated through implementation of a method according to at least one embodiment of the present disclosure.

For example, as shown in FIG. 3, an Inquirer may browse a website which includes a form where the Inquirer may provide his or her telephone number. In this example shown in FIG. 3, the Inquirer inputs "(555) 555-5555" which is submitted through the form to an enterprise upon clicking the "CLICK FOR YOUR QUOTES" link on the website.

In another example, an Inquirer may browse the same website shown in FIG. 3 through a mobile telephone. In this example, however, the website does not ask the Inquirer for his or her telephone number. Instead, when the Inquirer clicks the "CLICK FOR YOUR QUOTES" link on the website, the website queries the Inquirer's mobile device for his or her telephone number and transmits such telephone number to the enterprise. In another example, the Inquirer may login to the website and the enterprise may have the Inquirer's telephone number already saved in a database. In another example, the Inquirer may login to the website using Oauth, OpenID, or other common authentication mechanism which provides the enterprise with information from the Inquirer's social media presences which may include his or her telephone number. It should be appreciated that the Inquirer may provide his or her telephone number to the enterprise in a variety of ways and/or the enterprise may obtain the Inquirer's telephone number transparently to the Inquirer in a variety of ways.

Figure 4:
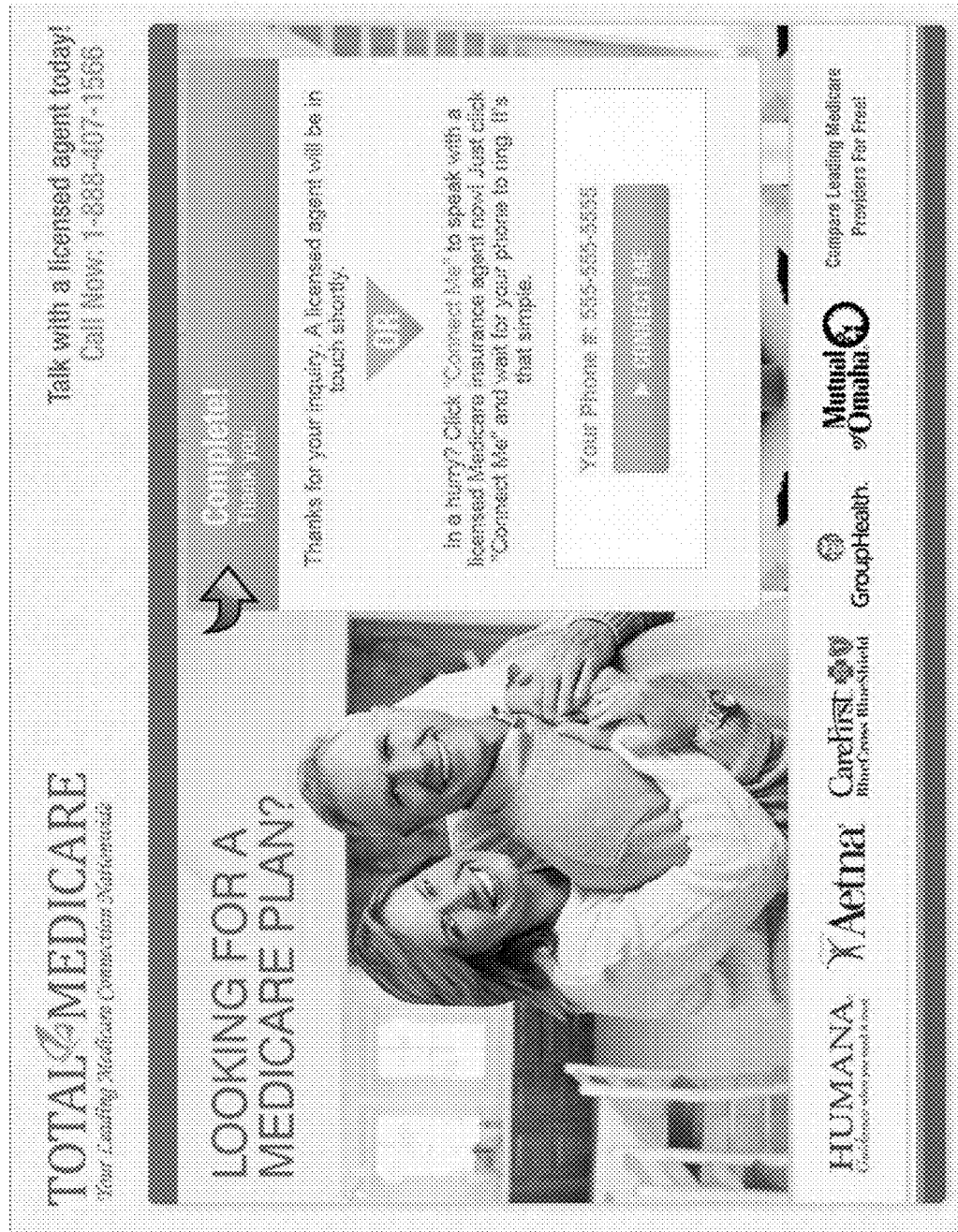

In at least one embodiment of the present disclosure, the Inquirer is offered a direct telephone connection to the enterprise in step 102. An example of such an offer is shown in FIG. 4. As shown in FIG. 4, after receiving the Inquirer's telephone number, the enterprise may ask the Inquirer whether he or she would like to obtain a direct connection to the enterprise. This offer may be presented to the Inquirer in a variety of ways, including, for example, through a website (as shown, for example, in FIG. 4), a push notification through a mobile application, a social media message, an email, or other communication.

In some embodiments, a user inputs his or her telephone number through a lead generation or contact form available on a website or other network-based resource in step 101. After collecting the phone number from the user in step 101, the website or other network-based resource offers to the user the option of receiving an immediate telephone call or connection in step 102. An example of such offer is shown in FIG. 4. It should be appreciated that this functionality may provide a higher conversion rate for leads by giving the user an immediate option to connect via the telephone, Skype, or other voice and/or video communication. It should be appreciated that in such embodiments an enterprise generates two leads from the user's interaction with the website or other network-based resource: the form submission and the immediate telephone call.

For example, a user visits an clothing retailer's website where he or she encounters a form that may be filled out to join the clothing retailer's mailing list. In this example, the form asks the user to input his or her telephone number. After submitting the form, the user is then given an immediate prompt asking the user whether he or she would like to discuss over the phone an opportunity to earn 20% off his or her next purchase by signing up for the clothing retailer's credit card. It should be appreciated that it may be more likely that the user signs up for the credit card at this instance because the user has already shown interest by engaging with the clothing retailer's website. In this example, the clothing retailer obtains two leads from the user's interaction with the website: the form submission and the telephone call.

In at least one embodiment of the present disclosure, the Inquirer accepts the offer and a call is placed to his or her telephone in step 104 through a communication system. As used in the present disclosure, a communication system may include, but is not limited to, a cloud-based telephone provider (i.e. Twilio, Clickatell, Avaya, Plivo, and others), a front-end application configured to place calls through one or more POTS lines (i.e. Asterisk), a mobile device, a mobile application, or other telephony solutions. In a preferred embodiment, the telephone call is placed using the telephone number provided by the Inquirer in step 101. In at least one embodiment of the present disclosure, the Inquirer answers the telephone call in step 105.

In at least one embodiment of the present disclosure, a call is placed to an enterprise contact as a Subject through the communication system in step 106. In a preferred embodiment, the Subject is selected based on the context of the request for communication from the Inquirer in order to provide the most efficient call based on the Inquirer's needs. For example, if an Inquirer is requesting a call through interaction with an email communication offering information about mortgage opportunities, the Subject that may be selected for communication in step 106 may be a mortgage sales representative at the enterprise.

It should be appreciated that the Subject may not need to be "selected" as described herein. The application in which the Inquirer requests communication in step 101 may be preconfigured to identify the appropriate Subject. For example, if the Inquirer provides his or her telephone number in step 101 through a technical support website for the enterprise, the application may be preconfigured to identify the enterprise customer service center as the Subject to dial in step 106.

In at least one embodiment of the present disclosure, the communication system places a call to the Subject in step 106 and the call is answered by the Subject in step 107. In at least one embodiment of the present disclosure, after both the Inquirer and the Subject answer the placed calls, the calls are merged together in step 108. In such an embodiment, the communication system is configured to merge, bridge, transfer, or otherwise connect the Subject and the Inquirer through the two placed calls in step 104 and step 106. In such an embodiment, merging the calls enables the Subject and the Inquirer to communicate directly in voice communication.

Figure 1B:
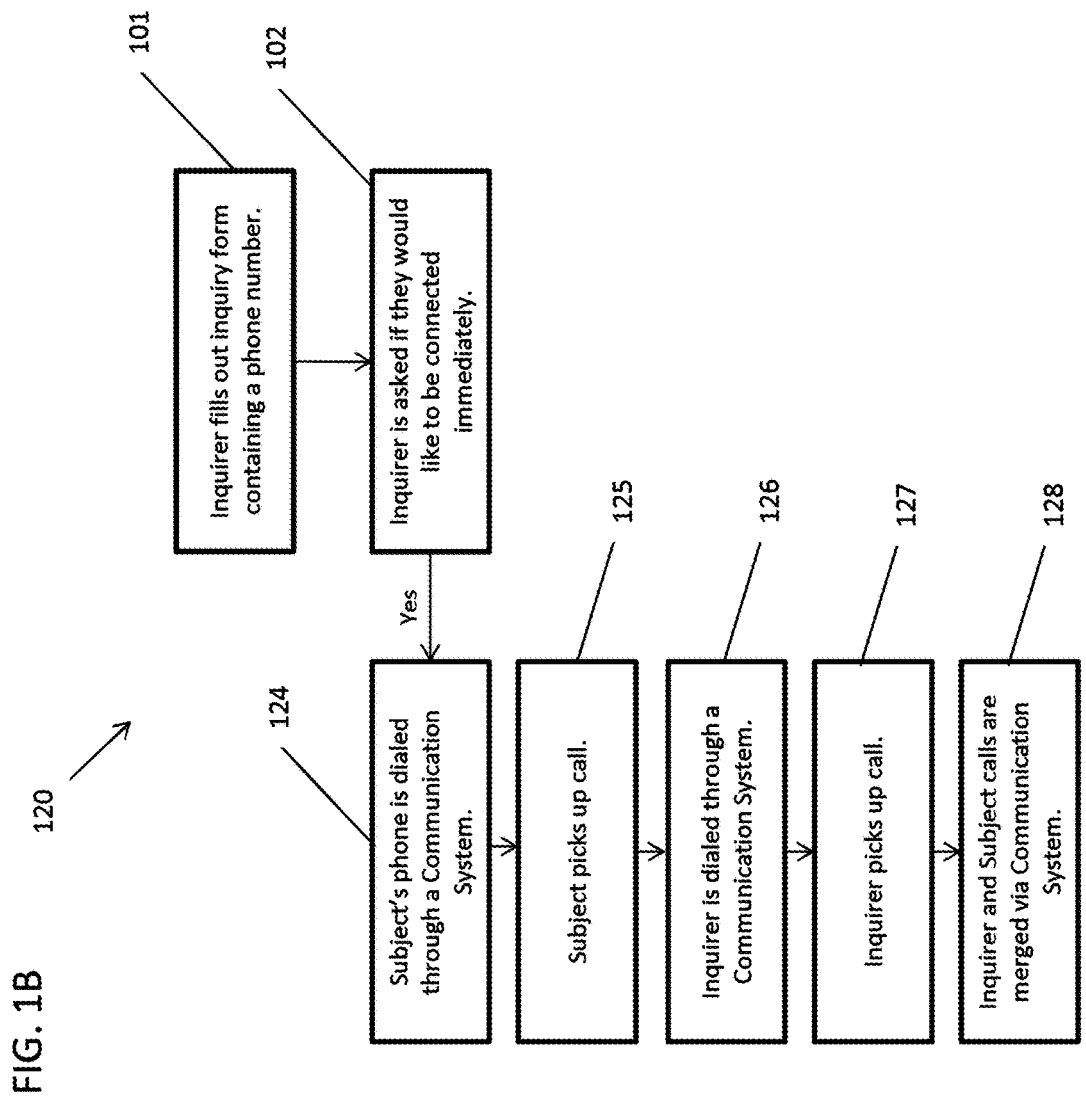
FIG. 1B illustrates a flowchart of a method for intelligent call lead generation according to at least one embodiment of the present disclosure.
Figure 1C:
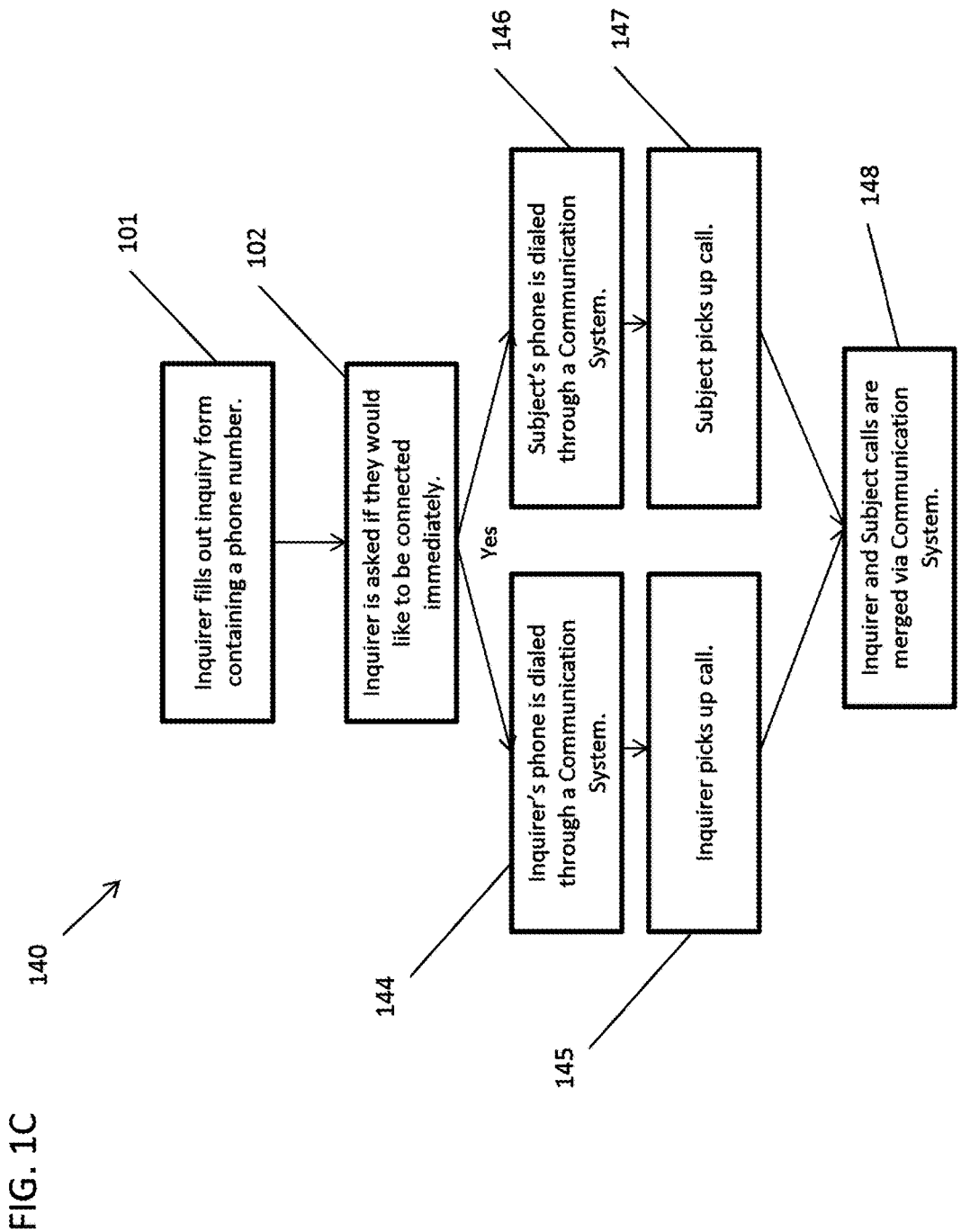
FIG. 1C illustrates a flowchart of a method for intelligent call lead generation according to at least one embodiment of the present disclosure.

It should be appreciated that steps 104 and 106 (with accompanying steps 105 and 107) may be made in any serial order or concurrently as shown, for example, in method 120 disclosed in FIG. 1B and in method 140 disclosed in FIG. 1C.

It should be appreciated, then, that the method 100 in FIG. 1A may be advantageous in that Subject time is not wasted by initiating calls to the Subject without an Inquirer waiting for a call to be merged. On the other hand, the method 120 in FIG. 1B may be advantageous by limiting the amount of time an Inquirer waits to speak with a Subject by connecting a telephone call to a Subject first before placing a call to the Inquirer.

For example, as shown in FIG. 1B, a communication system places a call to a Subject in step 124 prior to placing a call to the Inquirer in step 126 as shown in the method 120. The method 120 may be advantageous, for example, in the event that there are multiple Subjects that may be able to assist the Inquirer and the process of finding an available Subject prior to placing a call to the Inquirer may limit the amount of time that the Inquirer waits on hold to speak with the Subject. It should be appreciated, then, that step 124 may be repeated with a different Subject in the event that the call placed in step 124 is not answered.

For example, an Inquirer visits a website to request technical support for a product. After filling out a form describing his or her problem and inputting his or her telephone number in step 101, the Inquirer is asked whether he or she would like an immediate call for assistance in step 102, to which the Inquirer agrees. Then, in step 124, a communication system attempts to call an available technical support specialist to assist with the Inquirer's problem. In the event that the technical support specialist does not answer the placed call, step 124 may be repeated with the next available technical support specialist. Step 124 may, then, be repeated until a Subject answers the telephone call in step 125.

Referring now to FIG. 1C, there is shown a method 140 where calls are placed by a communication system concurrently to the Subject and Inquirer. In such an embodiment, after the Inquirer positively indicates that he or she would like an immediate contact in step 102, a call is placed by the communication to the Inquirer in step 144 and the Subject in step 146 concurrently. In such an embodiment, the calls are then merged in step 148 after the Subject answers his or her call in step 147 and the Inquirer answers his or her call in step 145. It should be appreciated that the method 140 may be advantageous by connecting the Inquirer and Subject as soon as possible through the communication system. It should be appreciated, then, that by initiating both of the calls concurrently, there is no delay in placing a call by waiting on a Subject or Inquirer to answer.

Figure 1D:
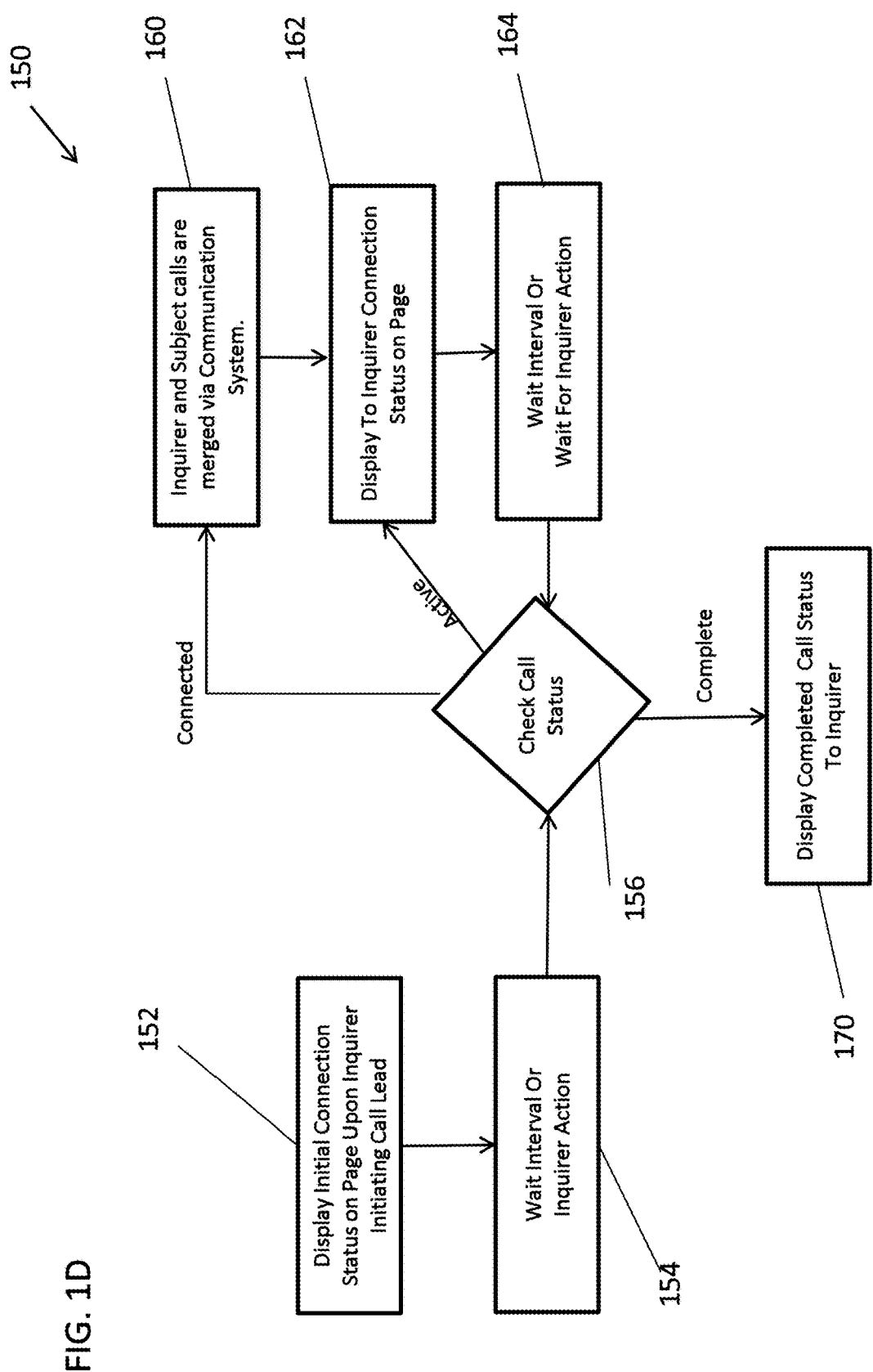
FIG. 1D illustrates a flowchart of a method for intelligent call lead generation according to at least one embodiment of the present disclosure.

Referring now to FIG. 1D, it is shown a method 150 for displaying a real-time call status in an intelligent call lead generation according to at least one embodiment of the present disclosure. As shown in FIG. 1D, the method 150 includes displaying an initial connection status on page upon inquirer initiating a call lead in step 152, waiting an interval or inquirer action in step 154, and checking a communication server for a call status in step 156. Based on a call status of 'connected,' 'active,' or 'complete,' the method 150 performs various steps. In the event that the call status is 'connected' in step 156, merging the inquirer and subject calls via a communication system in step 150, displaying a connection status on a connection status page in step 162, and waiting an interval or inquirer action in step 164. In the event the call status is 'active' in step 156, displaying a connection status on a connection status page in step 162, and waiting an interval or inquirer action in step 164. In the event the call status is 'complete' in step 156, displaying completed call status to the inquirer in step 170.

Figure 5:
Figure 6:
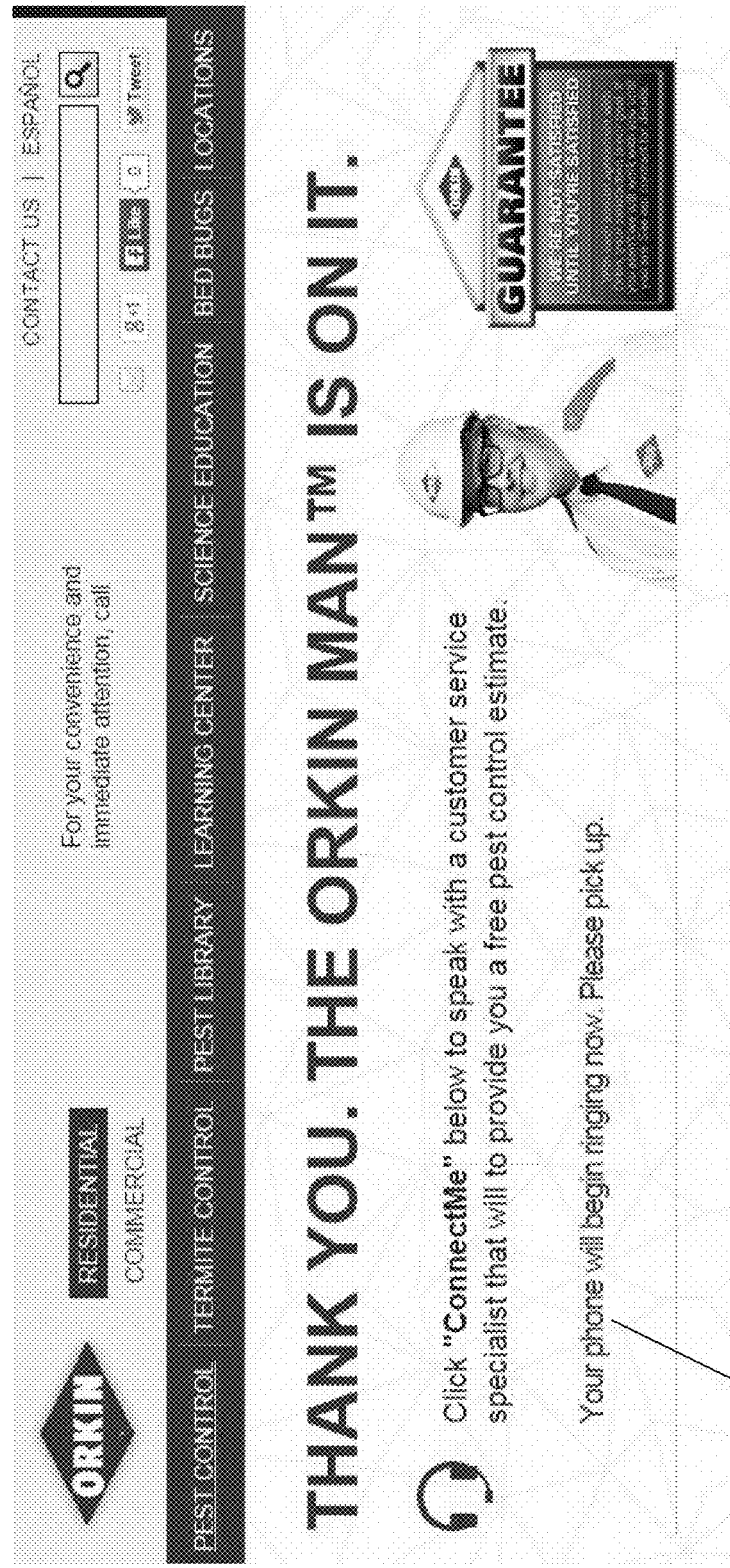

In step 152, an initial connection status is displayed on a web page to an inquirer initiating a call lead. In some embodiments, the initial connection status is indicative of a phone call being made to both an inquirer and a call subject. In some embodiments, the initial connection status is "initiating." For example, an inquirer fills out an inquiry for containing a phone number (i.e. step 101 from the method 140) and requests to be contacted immediately (i.e. step 102 from the method 140). An example graphical user interface 500 is shown in FIG. 5 displaying a button that, when pressed, initiates an immediate phone call to the inquirer. In this example, the inquirer's phone number is dialed through a communication system (i.e. step 144 from the method 140) and the subject's phone is dialed through the communication system (i.e. step 146 from the method 140). In this example, a call status web page may display to the inquirer that the call is "initiating." An example graphical user interface 600 is shown in FIG. 6 displaying an "initiating" call status 601.

In step 154, the method waits a time interval or notification of an inquirer action before proceeding. In such an embodiment, the phone call being performed to the inquirer and/or the call subject may take time to dial and connect and the method waits for the time interval to allow the connection to be performed. It should be appreciated that the time interval in step 154 may be a regularly polled timing interval that is configurable by a user (i.e. 1 second, 5 seconds, 10 seconds, etc.).

In step 156, a communication system is queried to determine the call status. In such an embodiment, a communication system maintains the telephone call to the inquirer and the call subject and may be queried by the status web page to transmit the call status. In such an embodiment, the call status may indicate whether the inquirer call and/or the call subject call is 'connected.'

Figure 7:
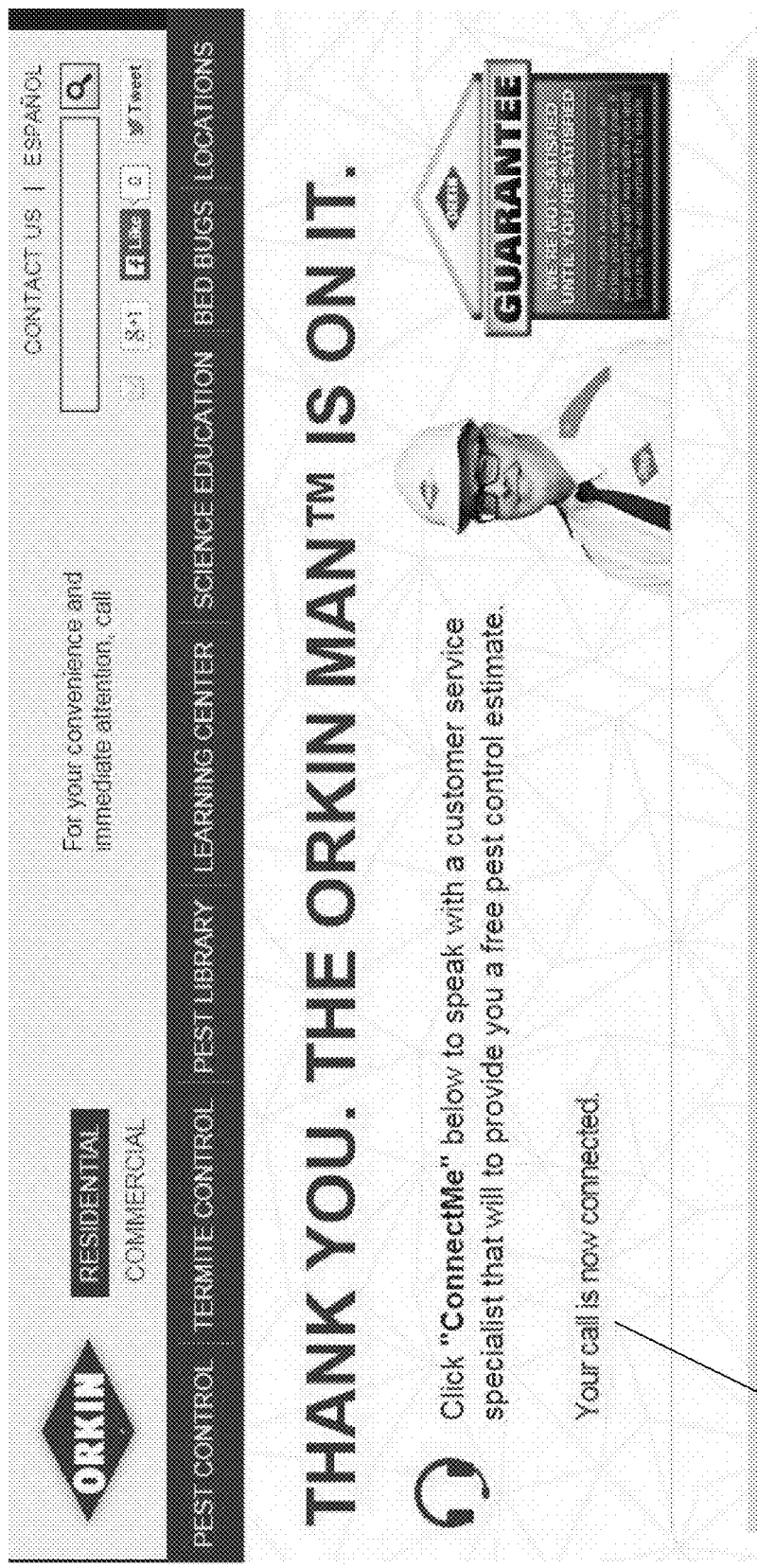

A 'connected' call status indicates that both the individually placed inquirer phone call and call subject phone call are connected, meaning that the inquirer answered the phone call placed by the communication system and the call subject answered the phone call placed by the communication system. In such an embodiment, upon receiving an indication from the communication system that the call status is 'connected,' the inquirer phone call and the call subject phone call are merged by the communication system. Then, in step 162, the web page is updated to indicate that the call is connected. An example graphical user interface 700 is shown in FIG. 7 displaying the call status as connected 701. Then, in step 164, the web page waits a configurable time interval or notification of an updated call status in step 164. After the time interval or notification of an updated call status, a call status check is performed in step 156.

In the event that the call status check performed in step 156 indicates that the call status is 'active,' then the status page is updated to display a connected call in step 162 and a wait is performed for a time period or retrieval of an updated inquirer action in step 164. In such an embodiment, the 'active' call status retrieved indicates that the inquirer phone call and the call subject phone call are merged and in active communication.

Figure 8:

In the event that the call status retrieved in step 156 indicates that the call is 'complete,' then the web page is updated to reflect a terminated phone call. An example graphical user interface 800 is shown in FIG. 8 displaying a completed call status 801.

Figure 2:
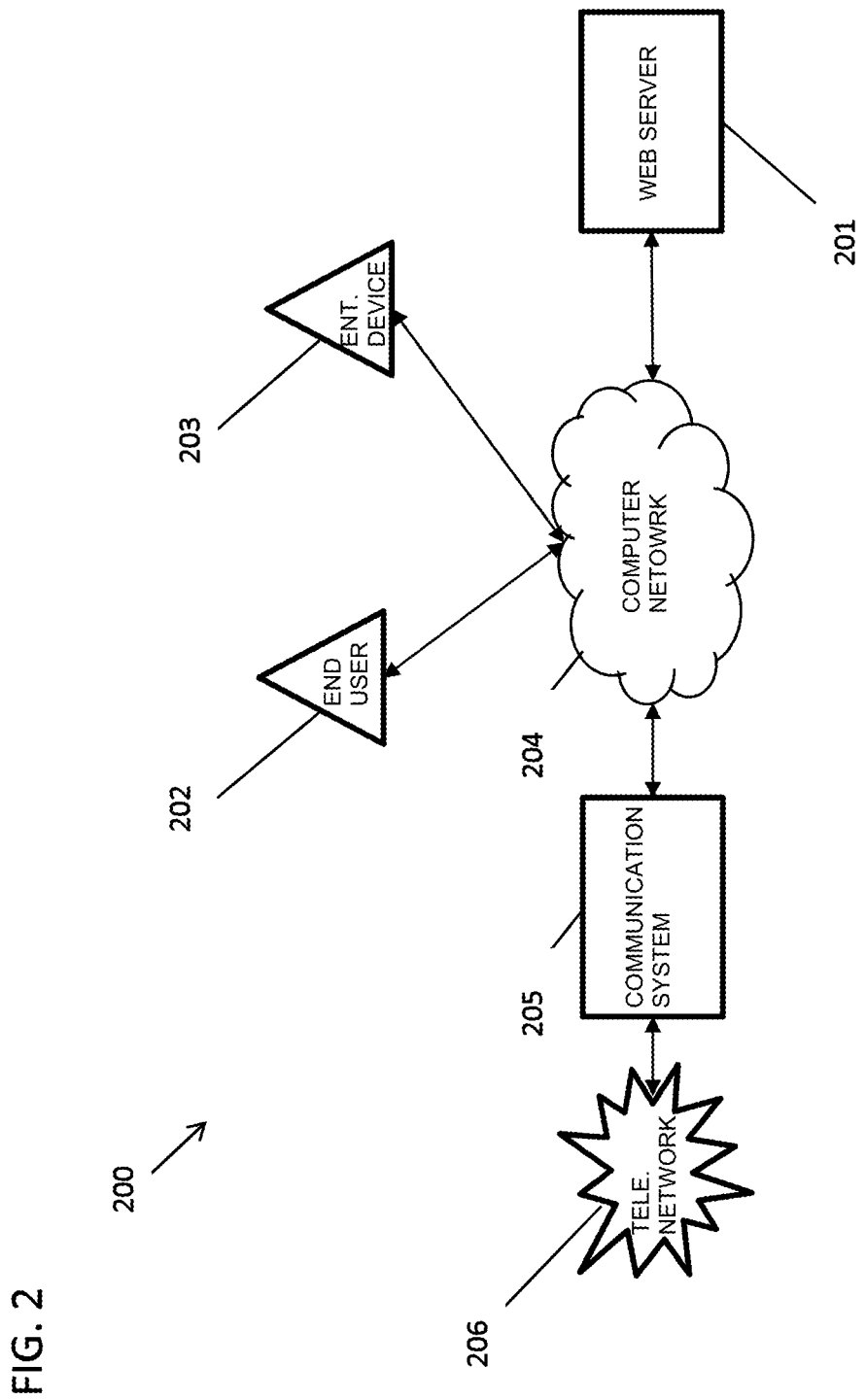
FIG. 2 displays the architecture of a system for intelligent call lead generation according to at least one embodiment of the present disclosure.

Referring now to FIG. 2, it is shown components of a system 200 for intelligent call lead generation according to at least one embodiment of the present disclosure. As shown in FIG. 2, the system 200 includes a web server 201, an end user device 202, an enterprise device 203, a computer network 204, a communication system 205, and a telephone network 206.

End user device 202 and enterprise device 203 include one or more computers, computing devices, or systems of a type well known in the art, such as a mainframe computer, workstation, personal computer, laptop computer, hand-held computer, cellular telephone, or personal digital assistant. End user device 202 and enterprise device 203 comprise such software, hardware, and componentry as would occur to one of skill in the art, such as, for example, one or more microprocessors, memory systems, input/output devices, device controllers, and the like. End user device 202 and enterprise device 203 also comprise one or more data entry means (not shown in FIG. 2) operable by users of end user device 202 and enterprise device 203 for data entry, such as, for example, a pointing device (such as a mouse), keyboard, touchscreen, microphone, voice recognition, and/or other data entry means known in the art. End user device 202 and enterprise device 203 also comprise a display means (not shown in FIG. 2) which may comprise various types of known displays such as liquid crystal diode displays, light emitting diode display, and the like upon which information may be displayed in a manner perceptible to the user.

End user device 202 and enterprise device 203 also may include the capacity to place and/or receive telephone calls, such as, for example, a mobile device (i.e. smartphone, call telephone), etc. In the event that end user device 202 and enterprise device 203 do not include the capacity to place and/or receive telephone calls, then additional hardware not show in FIG. 2 may be included in the system 200 to provide this functionality. For example, an end user may communicate his or her telephone number through the methods disclosed herein through end user device 202 but then may receive a telephone call placed to a POTS line or other telephony device not shown in FIG. 2. Similarly, an enterprise user acting as a Subject may receive a telephone call at any telephony device which may not be shown in FIG. 2, including, for example, an enterprise class telephony system, a smartphone, or other device.

End user device 202 and enterprise device 203 are configured to provide input or receive output to/from the webserver 201 to carry out one or more of the steps of the methods described herein. Webserver 201 comprises one or more server computers, computing devices, or systems of a type known in the art and accompanying web hosting application software, such as, for example, IIS, Apache, and the like. Webserver 201 further comprises such software, hardware, and componentry as would occur to one of skill in the art, such as, for example, microprocessors, memory systems, input/output devices, device controllers, display systems, and the like. Webserver 201 may comprise one of many well-known servers, such as, for example, IBM's AS/400 Server, IBM's AIX UNIX Server, Linux, or MICROSOFT's WINDOWS Server. Webserver 201 may be physical hardware or a guest operating system within a virtual infrastructure.

Each component in the system 200 communicates with other electronically coupled components through the computer network 204. The network 204 may include, but is not limited to, the Internet, a WAN, LAN, private network, public network, or any other type of computer network. The communication between any component and another computer may be bidirectional.

Telephone network 206 may include a telecommunications network for telephone calls, including, but not limited to, a cellular telephone network, a fixed line network, a wireless network, a private network, and/or a public telephone network provided by one or more public telephone operators. The webserver 201 may submit calls to the communication system 205 which places such calls over the telephone network 206. For example, a consumer inputs his or her telephone number through the end user device 202 to the webserver 201. The webserver 201 then requests that the communication system 205 initiate a call to the consumer and the enterprise device 203 through the telephone network 206.

While the description above refers to particular embodiments of the present invention, it will be understood that many modifications may be made without departing from the spirit thereof. The accompanying concepts are intended to cover such modifications as would fall within the true scope and spirit of the present invention. The presently disclosed embodiments are therefore to be considered in all respects illustrative and not restrictive, the scope of the invention being indicated by the appended concepts, rather than the foregoing description, and all changes which come within the meaning and range of equivalency of the concepts are therefore intended to be embraced therein.

The invention claimed is:

1. A computerized method for intelligent call lead generation, the method comprising:
receiving, at a communications system, information associated with a consumer, the information associated with a consumer comprising a telephone number of the consumer wherein the information associated with the consumer becomes preexisting information associated with the consumer after it has been received at the communications system;
receiving, from the consumer, a request for immediate communication;
immediately after receiving the request for immediate communication, identifying an enterprise contact based at least in part on the request for communication from the consumer;
placing an immediate first telephone call to the telephone number with the communication system and a second telephone call to a second telephone number associated with the enterprise contact with the communication system, wherein placing the immediate first telephone call is accomplished using the preexisting information associated with the consumer;
retrieving, from the communication system, a real-time call status;
transmitting a web page to the consumer;
merging the first telephone call and the second telephone call with the communication system into a merged call;
transmitting communication between the consumer and the enterprise contact with the communication system through the merged call; and,
updating, in real-time, the transmitted web page in response to the retrieved real-time call status to display information, wherein the displayed information is triggered by progress stages of the first telephone call, the second telephone call, and the merged call.

2. The method of claim 1, wherein the merging step is performed in the event that the real-time call status indicates the first call and the second call are each connected.

3. The method of claim 1, wherein the request for immediate communication is from the web page.

4. The method of claim 1, wherein the displayed information based on the real-time call status sequentially indicates: (1) that the first call and the second call are each connected, (2) that the merged call is active, and (3) that the merged call is complete.

5. The method of claim 1, further comprising sending, to the consumer, an option for immediate communication.

6. The method of claim 1, wherein placing the first telephone call is done concurrently with placing the second telephone call.

7. A system for intelligent call lead generation, the system comprising:
a computer network;
a first server, the first server configured to:
receive information associated with a consumer, the information associated with a consumer comprising a telephone number of the consumer wherein the information associated with the consumer becomes preexisting information associated with the consumer after it has been received at the first server,
receive, from the consumer, a request for immediate communication, and, immediately after receiving the request for immediate communication, identify an enterprise contact based at least in part on the request for communication from the consumer; and, a communication system, the communication system configured to:

immediately place a first telephone call to the consumer, and a second telephone call to the enterprise contact, wherein placing the immediate first telephone call is accomplished using the preexisting information associated with the consumer, merge the first telephone call and the second telephone call into a merged call, and, transmit communication between the consumer and the enterprise contact through the merged call, wherein the first server is further configured to:

retrieve a real time call status, transmit a web page to the consumer over the computer network, and, update, in real time, the transmitted web page in response to the retrieved real-time call status to display information, wherein the displayed information is triggered by progress stages of the first telephone call, the second telephone call, and the merged call.

8. The system of claim 7, wherein the communication system is further configured to merge the first telephone call and the second telephone call based on the real-time call status.

9. The system of claim 7, wherein the first server is configured to receive the request for communication through activity on a web page.

10. The method of claim 7, wherein the computer network is the Internet.

11. The method of claim 7, wherein the communication system is a voice over Internet Protocol (IP) system.

12. The method of claim 7, wherein the communication system is a Plain old telephone service (POTS).

13. The system of claim 7, wherein the displayed information based on the real-time call status sequentially indicates: (1) that the first call and the second call are each connected, (2) that the merged call is active, and (3) that the merged call is complete.

14. The system of claim 7, wherein the first server is further configured to send, to the consumer, an option for immediate communication.

15. The system of claim 7, wherein placing the first telephone call is done concurrently with placing the second telephone call.

* * * * *